(12) United States Patent
Hsu et al.

(10) Patent No.: US 9,112,261 B2
(45) Date of Patent: Aug. 18, 2015

(54) ANTENNA STRUCTURE AND WIRELESS COMMUNICATION DEVICE USING THE SAME

(71) Applicant: Chiun Mai Communication Systems, Inc., New Taipei (TW)

(72) Inventors: Cho-Kang Hsu, New Taipei (TW); Jin-Bo Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 25 days.

(21) Appl. No.: 14/014,616

(22) Filed: Aug. 30, 2013

(65) Prior Publication Data

US 2014/0295917 A1 Oct. 2, 2014

(30) Foreign Application Priority Data

Apr. 2, 2013 (TW) .............................. 102111898 A

(51) Int. Cl.
*H04B 1/18* (2006.01)
*H01Q 9/04* (2006.01)
*H01Q 5/371* (2015.01)
*H04M 1/02* (2006.01)

(52) U.S. Cl.
CPC ............. *H01Q 9/0421* (2013.01); *H01Q 5/371* (2015.01); *H04M 1/026* (2013.01)

(58) Field of Classification Search
CPC ........ H01Q 1/00; H01Q 5/0027; H01Q 21/29
USPC ............ 455/73, 19, 562.1, 575.7, 103, 168.1, 455/269; 343/700, 860, 893, 702, 770, 846, 343/700 MS
See application file for complete search history.

(56) References Cited

U.S. PATENT DOCUMENTS

2003/0189522 A1* 10/2003 Zeilinger ...................... 343/702

* cited by examiner

*Primary Examiner* — Tuan Pham
(74) *Attorney, Agent, or Firm* — Novak Druce Connolly Bove + Quigg LLP

(57) ABSTRACT

An antenna structure includes a feed portion, a ground portion, a first radiating body, a second radiating body, and a third radiating body. The feed portion is connected to a first shared portion of the first radiating body. The second radiating body further includes a second shared portion connected to the first shared portion. The first and second shared portions are included in a third radiating body together with a combining portion between the second shared portion and the ground portion. The first radiating body receives and sends wireless signals of a first frequency band, the second radiating body uses a second frequency band, and the third radiating body uses a third frequency band.

20 Claims, 3 Drawing Sheets

ANTENNA STRUCTURE AND WIRELESS COMMUNICATION DEVICE USING THE SAME

BACKGROUND

1. Technical Field

The disclosure generally relates to antenna structures and particularly to an antenna structure having a wider bandwidth and a wireless communication device using the antenna structure.

2. Description of Related Art

To communicate in multi-band communication systems, a bandwidth of an antenna of a wireless communication device such as a mobile phone needs to be wide enough to cover frequency bands of multiple bands. In addition, because of the miniaturization of the wireless communication device, space available for the antenna is reduced and limited. Therefore, it is necessary to design the antenna to have the wider bandwidth within a reduced and limited space.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
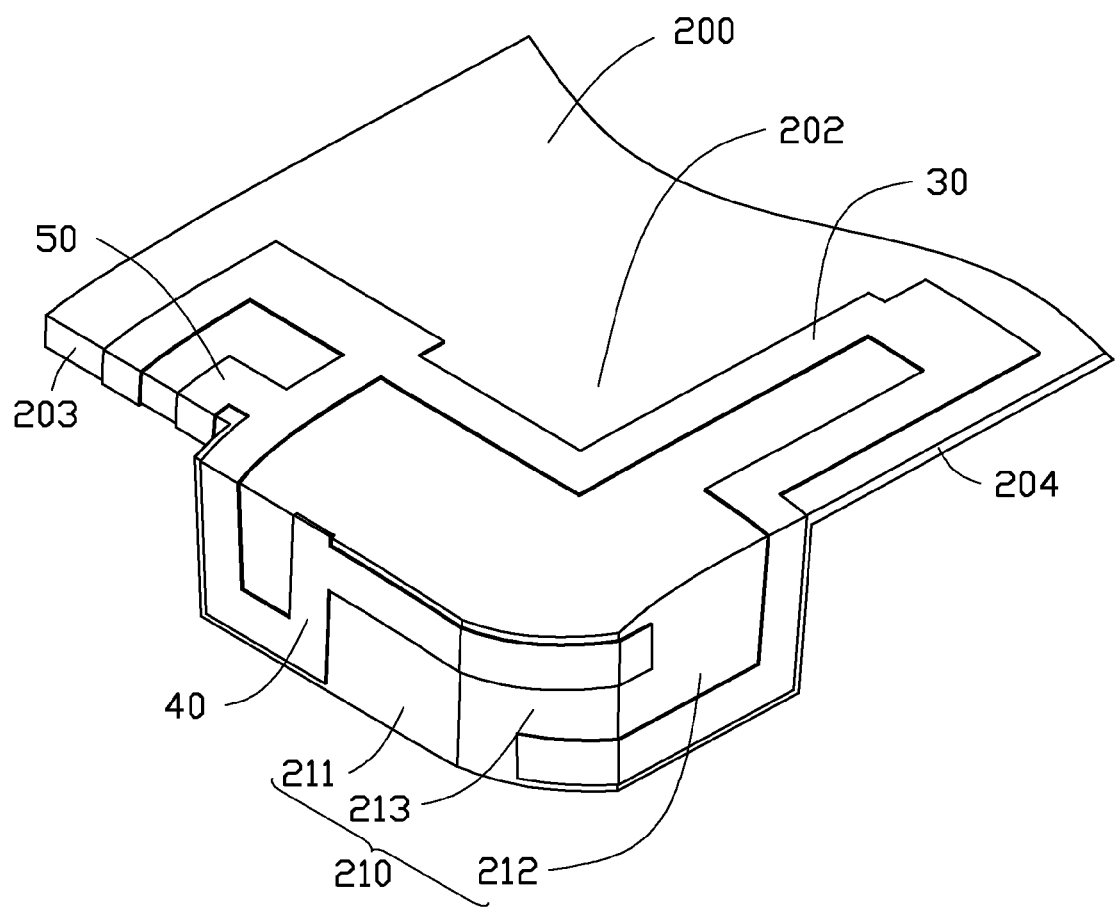
FIG. 1 is a schematic view of a wireless communication device having an antenna structure according to an exemplary embodiment.

FIG. 1 is a schematic view of an antenna structure 100 used in a wireless communication device (not labeled), according to an exemplary embodiment. The wireless communication device may be a mobile phone and has a global positioning system (GPS) function and a WIRELESS FIDELITY (WI-FI) function. In this exemplary embodiment, the antenna structure 100 is assembled on a main body 200 of the wireless communication device. The main body 200 may be a bracket for installing and supporting a printed circuit board (not shown) of the wireless communication device.

Figure 2:
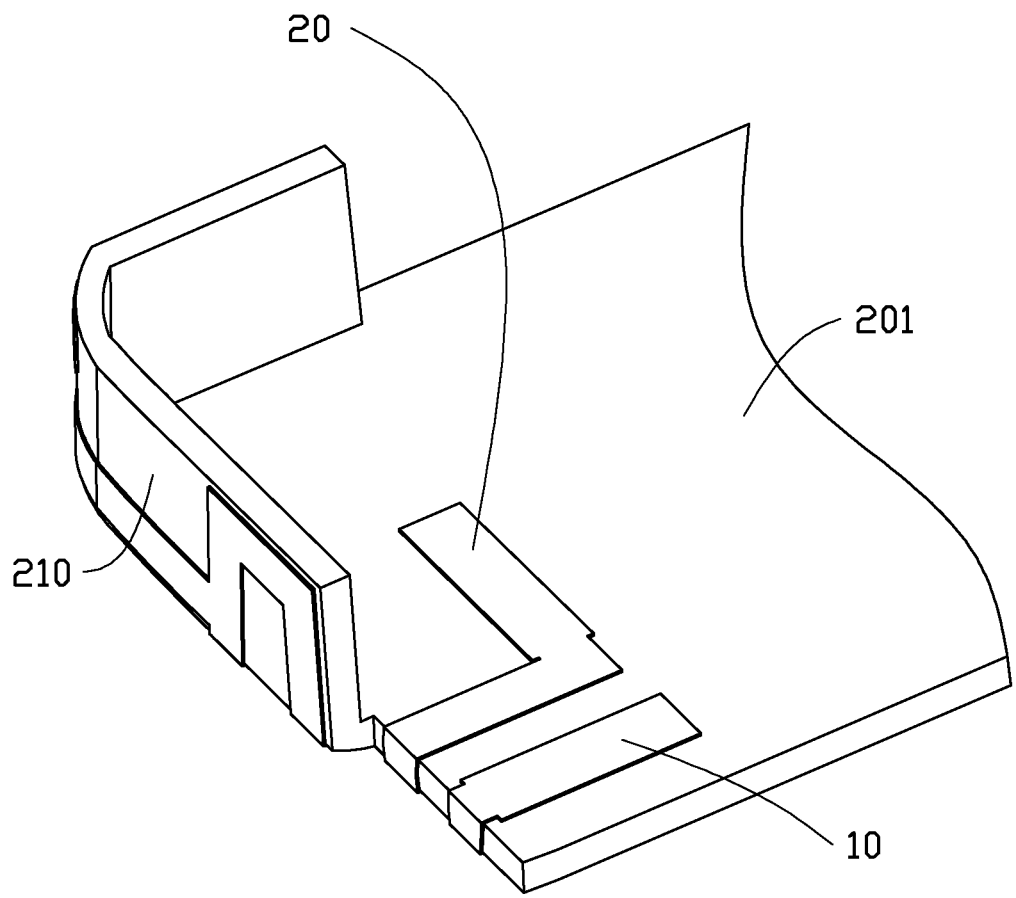
FIG. 2 is similar to FIG. 1, but viewed from another angle.
Figure 3:
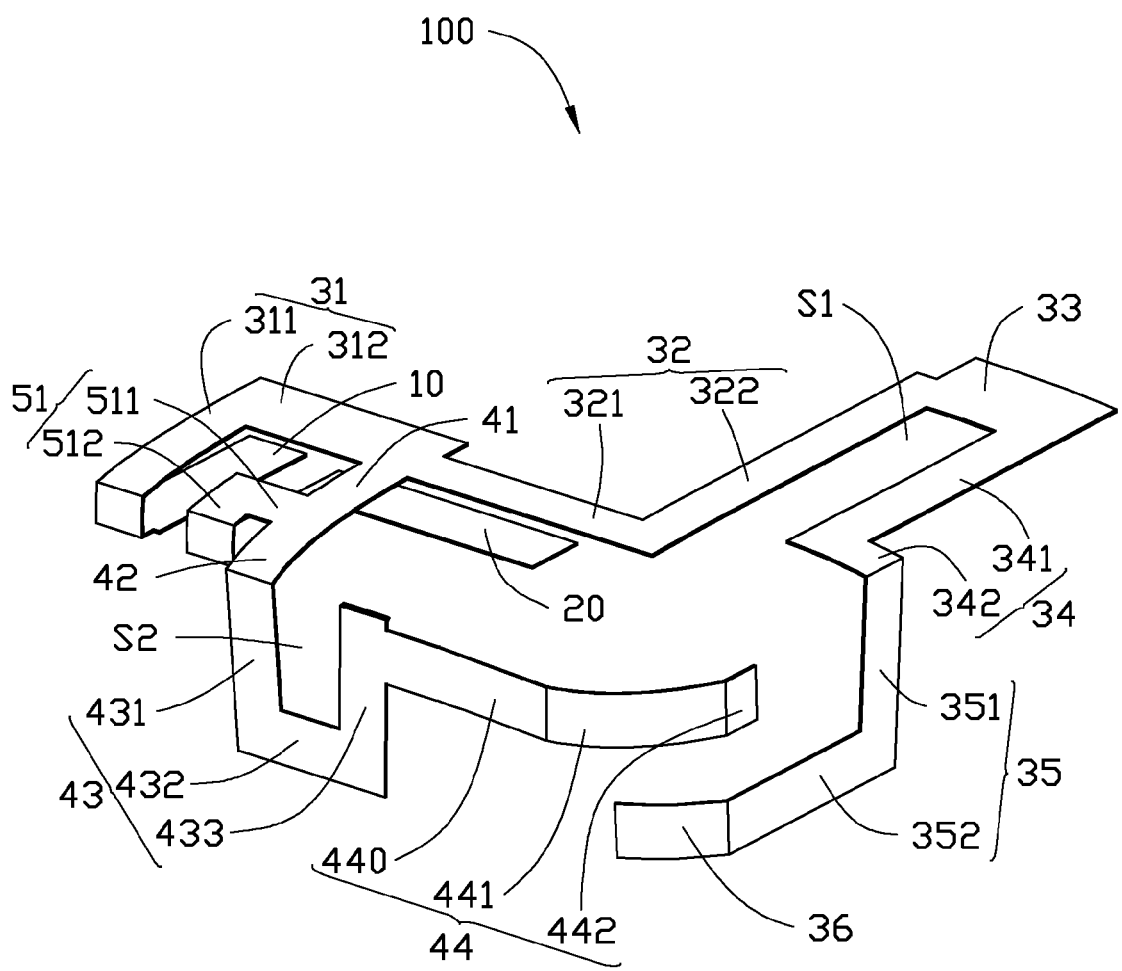
FIG. 3 is a schematic view of the antenna structure of FIG. 1, according to an exemplary embodiment.

Referring to FIG. 2, the main body 200 includes a first surface 201, a second surface 202 opposite to the first surface 201, a first side surface 203, and a second side surface 204. The first surface 201 may be a bottom surface and the second surface 202 may be a top surface. Both the first and second side surfaces 203, 204 are connected to the first surface 201 and the second surface 202. A flange 210 extends from a junction of the first side surface 203 and the second side surface 204 and extends towards the first surface 201. The flange 210 includes a first surface 211, a second surface 212, and a connecting surface 213 connected between the first surface 211 and the second surface 212.

The antenna structure 100 includes a feed portion 10, a ground portion 20, a first radiating body 30, a second radiating body 40, and a third radiating body 50.

In this exemplary embodiment, the feed portion 10 is positioned on the first surface 201 and the first side surface 203. The feed portion 10 is electronically connected to a feed contact of the wireless communication device (not shown), which feeds current for the antenna structure 100. The ground portion 20 is adjacent to the feed portion 10 and also positioned on the first surface 201 and the first side surface 203. The ground portion 20 is electronically connected to a ground contact of the wireless communication device (not shown) and configured to provide a ground connection for antenna structure 100.

The first radiating body 30, the second radiating body 40, and the third radiating body 50 are electronically connected to the feed portion 10. The third radiating body 50 is electronically connected to the ground portion 20.

The first radiating body 30 is positioned on the second surface 202 and the flange 210. The first radiating body 30 includes a first shared portion 31, a first extending portion 32, a second extending portion 33, a third extending portion 34, a fourth extending portion 35, and a fifth extending portion 36, connected in that order. The first shared portion 31, the first extending portion 32, the second extending portion 33, and the third extending portion 34 are coplanar. In this exemplary embodiment, the first shared portion 31, the first extending portion 32, the second extending portion 33, and the third extending portion 34 are positioned on the second surface 202.

The first shared portion 31 includes a first shared section 311 and a second shared section 312. The first shared section 311 is electronically connected to an end of the feed portion 10 positioned on the first side surface 203. The second shared section 312 is perpendicularly connected to a distal end of the first shared section 311 away from the feed portion 10, and extends away from the first shared section 311.

The first extending portion 32 includes a first extending section 321 and a second extending section 322. A width of the first extending section 321 is less than the width of the second shared section 312. The first extending section 321 extends from one end of the second shared section 312 away from the first shared section 311. The second extending section 322 is connected to a distal end of the first extending section 321 away from the second shared section 312, and extends away from the first shared section 311. The second extending section 322 is parallel to the first shared section 311.

The second extending portion 33 is connected to a distal end of the second extending section 322 away from the first extending section 321, extends away from the first shared section 311, and is parallel to the first extending section 321.

The third extending portion 34 includes a third extending section 341 and a fourth extending section 342. The third extending section 341 is connected to a distal end of the second extending portion 33 away from the second extending section 322, and extends towards the first extending section 321. The third extending section 341 is parallel to the second extending section 322. The fourth extending section 342 is connected to a distal end of the third extending section 341 away from the second extending portion 33, extends away from second extending section 322, and is parallel to the second extending portion 33. The second extending section 322, the second extending portion 33, and the third extending section 341 are spaced apart and therefore cooperatively form a first slot S1 between them.

The fourth extending portion 35 is not coplanar with the first shared portion 31, the first extending portion 32, the second extending portion 33, and the third extending portion 34. In this exemplary embodiment, the fourth extending portion 35 is portioned on the second surface 212. The fourth extending portion 35 includes a fifth extending section 351 and a sixth extending section 352. The fifth extending portion 35 has one end perpendicularly connected to an end of the fourth extending section 342 away from the third extending section 341, and another end perpendicularly connected to the sixth extending section 352.

The fifth extending portion 36 is positioned on the connecting surface 213 and connected to the sixth extending section 352 by an arced connection. The antenna structure 100 can obtain a first frequency band by adjusting a length of the first radiating body 30 and a size of the first slot S1. In this exemplary embodiment, the first frequency band is about 1570 MHz-1580 MHz (e.g., a frequency band of GPS).

The second radiating body 40 includes the first shared portion 31, a second shared portion 41, a first radiating portion 42, a second radiating portion 43, and a third radiating portion 44, connected in that order. The first shared portion 31, the second shared portion 41, and the first radiating portion 42 are coplanar. The second shared portion 41 is perpendicularly connected to the second shared section 312 and the first extending section 321, and parallel to the first shared section 311. The first radiating portion 42 is connected to a distal end of the second shared portion 41 and collinear with the second shared portion 41.

The second radiating portion 43 is not coplanar with the first shared portion 31, the second shared portion 41, and the first radiating portion 42. In this exemplary embodiment, the second radiating portion 43 is positioned on the first side surface 211. The second radiating portion 43 is substantially U-shaped and includes a first radiating section 431, a second radiating section 432, and a third radiating section 433, connected in that order. The first radiating section 431 is perpendicularly connected to the first radiating portion 42. The second radiating section 432 has one end perpendicularly connected to a distal end of the first radiating section 431 away from the first radiating portion 42, and another end perpendicularly connected to the third radiating section 433. The first radiating section 431, the second radiating section 432, and the third radiating section 433 cooperatively form a second slot S2 between them.

The third radiating portion 44 includes a first resonating section 440, a second resonating section 441, and a third resonating section 442, connected in that order. The first resonating section 440 and the second radiating portion 43 are coplanar. The first resonating section 440 is perpendicularly connected to a side of the third radiating section 433 away from the first radiating section 431 and parallel to the second radiating section 432. The second resonating section 441 is positioned on the connecting surface 213. The second resonating section 441 is connected to the first resonating section 440 by an arced connection and spaced from the fifth extending portion 36. The third resonating section 442 is positioned on the second side surface 212. The third resonating section 442 is connected to the second resonating section 441 by an arced connection and spaced from the sixth extending section 352. The antenna structure 100 can obtain a second frequency band by adjusting a length of the second radiating body 40 and a size of the second slot S2, changing a distance between the second resonating section 441 and the fifth extending portion 36, and changing a distance between the third resonating section 442 and the sixth extending section 352. In this exemplary embodiment, the second frequency band is about 2400 MHz-2500 MHz (e.g., a frequency band of WI-FI).

The third radiating body 50 includes the first shared portion 31, the second shared portion 41, and a combining portion 51. The combining portion 51 is positioned on the second surface 202. The combining portion 51 includes a first combining section 511 and a second combining section 512. The first combining section 511 is perpendicularly connected to the second shared portion 41 and the first radiating portion 42, extends towards the first shared section 311, and is parallel to the second shared section 312. The second combining section 512 is perpendicularly connected between the first combining section 311 and the ground portion 20, and is parallel to the first shared section 311. The antenna structure 100 can obtain a third frequency band by adjusting a length of the third radiating body 50, changing a distance between the first combining section 511 and the second shared section 312, and changing a distance between the second combining section 512 and the first shared section 311. In this exemplary embodiment, the third frequency band is about 4900 MHz-5850 MHz (e.g., a frequency band of WI-FI).

The antenna structure 100 includes a plurality of radiating bodies (e.g., the first to third radiating bodies 30, 40, and 50) to transmit and receive signals of multiple frequency bands so that an overall bandwidth of the antenna structure 100 is widened. In addition, the first radiating body 30, the second radiating body 40, and the third radiating body 50 share the first shared portion 31, and the second radiating body 40 and the third radiating body 50 share the first shared portion 31 and the second shared portion 41, so that the structure of the antenna structure 100 is reduced and minimal space is required.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An antenna structure, comprising:
a feed portion;
a ground portion;
a first radiating body comprising a first shared portion, a first extending portion, a second extending portion, a third extending portion, a fourth extending portion, and a fifth extending portion connected in that order, wherein the first shared portion is connected to the feed portion and comprises a first shared section and a second shared section, the first extending portion comprises a first extending section and a second extending section, the first extending section is connected between the second shared section and the second extending section; the second extending portion is perpendicularly connected to a distal end of the second extending section; the third extending portion comprises a third extending section and a fourth extending section, the third extending section is perpendicularly connected between the second extending portion and the fourth extending section; the fourth extending portion comprises a fifth extending section and a sixth extending section, the fifth extending portion has one end perpendicularly connected to the fourth extending section and another end perpendicularly connected to the sixth extending section; the fifth extending portion is connected to the sixth extending section by an arced connection;
a second radiating body comprising the first shared portion and a second shared portion connected to the first shared portion; and
a third radiating body comprising the first shared portion, the second shared portion, and a combining portion connected between the second shared portion and the ground portion; wherein when a feed signal is input to the feed portion, the first radiating body receives and sends wireless signals of a first frequency band, the second radiating body receives and sends wireless signals of a second frequency band, and the third radiating body receives and sends wireless signals of a third frequency band.

2. The antenna structure of claim 1, wherein the first shared section is electronically connected to an end of the feed portion, the second shared section is perpendicularly connected to a distal end of the first shared section and extends away from the first shared section.

3. The antenna structure of claim 1, wherein the combining portion comprises a first combining section and a second combining section, the first combining section is connected between the second shared portion and an end of the second combining section; another end of the second combining section is connected to the ground portion.

4. The antenna structure of claim 3, wherein the first combining section is parallel to the second shared section, the second combining section is parallel to the first shared section.

5. The antenna structure of claim 1, wherein the first extending portion, the second extending portion, and the third extending portion are spaced apart and therefore cooperatively form a first slot between them.

6. The antenna structure of claim 1, wherein the second radiating body further comprises a first radiating portion, a second radiating portion, and a third radiating portion connected in that order, the first radiating portion is connected to a distal end of the second shared portion and collinear with the second shared portion.

7. The antenna structure of claim 6, wherein the second radiating portion comprises a first radiating section, a second radiating section, and a third radiating section connected in that order, the first radiating section is connected to the first radiating portion, the second radiating section has one end perpendicularly connected to a distal end of the first radiating section and another end perpendicularly connected to the third radiating section; the third radiating portion comprises a first resonating section, a second resonating section, and a third resonating section connected in that order, the first resonating section is perpendicularly connected to a side of the third radiating section, the second resonating section is connected between the first resonating section and the third resonating section.

8. The antenna structure of claim 7, wherein the first radiating section, the second radiating section, and the third radiating section cooperatively form a second slot between them.

9. A wireless communication device, comprising:
a main body; and
an antenna structure positioned on the main body, the antenna structure comprising:
a feed portion;
a ground portion;
a first radiating body comprising a first shared portion connected to the feed portion, the first radiating body configured to obtain a first frequency band;
a second radiating body configured to obtain a second frequency band and comprising the first shared portion, a second shared portion, a first radiating portion, a second radiating portion, and a third radiating portion connected in that order, wherein the first shared portion, the second shared portion, and the first radiating portion are coplanar, the second radiating portion is not coplanar with the first shared portion, the second shared portion, and the first radiating portion; and
a third radiating body comprising the first shared portion, the second shared portion, and a combining portion connected between the second shared portion and the ground portion, the third radiating body configured to obtain a third frequency band.

10. The wireless communication device of claim 9, wherein the main body comprises a first surface, a second surface opposite the first surface, a first side surface, and a second side surface, a flange is protruded in a junction of the first side surface and the second side surface; both the feed portion and the ground portion are positioned on the first surface and the first side surface; the first radiating body and the second radiating body are positioned on the second surface and the flange; the third radiating body is positioned on the second surface.

11. The wireless communication device of claim 9, wherein the first shared portion comprises a first shared section and a second shared section, the first shared section is electronically connected to an end of the feed portion, the second shared section is perpendicularly connected to a distal end of the first shared section and extends away from the first shared section.

12. The wireless communication device of claim 9, wherein the combining portion comprises a first combining section and a second combining section, the first combining section is connected between the second shared portion and an end of the second combining section; another end of the second combining section is connected to the ground portion.

13. The wireless communication device of claim 11, wherein the first radiating body further comprises a first extending portion, a second extending portion, a third extending portion, a fourth extending portion, and a fifth extending portion connected in that order, the first extending portion is connected to the first shared portion.

14. The wireless communication device of claim 13, wherein the first extending portion, the second extending portion, and the third extending portion are spaced apart and therefore cooperatively form a first slot between them.

15. The wireless communication device of claim 13, wherein the first extending portion comprises a first extending section and a second extending section, the first extending section is connected between the second shared section and the second extending section; the second extending portion is perpendicularly connected to a distal end of the second extending section; the third extending portion comprises a third extending section and a fourth extending section, the third extending section is perpendicularly connected between the second extending portion and the fourth extending section; the fourth extending portion comprises a fifth extending section and a sixth extending section, the fifth extending portion has one end perpendicularly connected to the fourth extending section and another end perpendicularly connected to the sixth extending section; the fifth extending portion is connected to the sixth extending section by an arced connection.

16. The wireless communication device of claim 9, wherein the first radiating portion is connected to a distal end of the second shared portion and collinear with the second shared portion.

17. The wireless communication device of claim 9, wherein the second radiating portion comprises a first radiating section, a second radiating section, and a third radiating section connected in that order, the first radiating section is connected to the first radiating portion, the second radiating section has one end perpendicularly connected to a distal end of the first radiating section and another end perpendicularly connected to the third radiating section, the third radiating portion comprises a first resonating section, a second resonating section, and a third resonating section connected in that order, the first resonating section is perpendicularly connected to a side of the third radiating section, the second resonating section is connected between the first resonating section and the third resonating section.

18. The wireless communication device of claim 17, wherein the first radiating section, the second radiating section, and the third radiating section cooperatively form a second slot between them.

19. A wireless communication device, comprising:
a main body; and
an antenna structure positioned on the main body, the antenna structure comprising:
a feed portion;
a ground portion;
a first radiating body configured to obtain a first frequency band and comprising a first shared portion, a first extending portion, a second extending portion, a third extending portion, a fourth extending portion, and a fifth extending portion connected in that order, wherein the first shared portion is connected to the feed portion and comprises a first shared section and a second shared section, the first extending portion comprises a first extending section and a second extending section, the first extending section is connected between the second shared section and the second extending section; the second extending portion is perpendicularly connected to a distal end of the second extending section; the third extending portion comprises a third extending section and a fourth extending section, the third extending section is perpendicularly connected between the second extending portion and the fourth extending section; the fourth extending portion comprises a fifth extending section and a sixth extending section, the fifth extending portion has one end perpendicularly connected to the fourth extending section and another end perpendicularly connected to the sixth extending section; the fifth extending portion is connected to the sixth extending section by an arced connection;
a second radiating body comprising the first shared portion and a second shared portion connected to the first shared portion, the second radiating configured to obtain a second frequency band; and
a third radiating body comprising the first shared portion, the second shared portion, and a combining portion connected between the second shared portion and the ground portion, the third radiating body configured to obtain a third frequency band.

20. The wireless communication device of claim 19, wherein the main body comprises a first surface, a second surface opposite the first surface, a first side surface, and a second side surface, a flange is protruded in a junction of the first side surface and the second side surface; both the feed portion and the ground portion are positioned on the first surface and the first side surface; the first radiating body and the second radiating body are positioned on the second surface and the flange; the third radiating body is positioned on the second surface.

* * * * *